United States Patent
Simakov et al.

(10) Patent No.: US 11,339,490 B2
(45) Date of Patent: May 24, 2022

(54) ALUMINUM ELECTROLYZER ELECTRODE (VARIANTS)

(71) Applicant: OBSHCHESTVO S OGRANICHENNOY OTVETSTVENNOST'YU "OBEDINENNAYA KOMPANIYA RUSAL INZHENERNO-TEKHNOLOGICHESKIY TSENTR", Krasnoyarsk (RU)

(72) Inventors: Dmitriy Aleksandrovich Simakov, Krasnoyarsk (RU); Aleksandr Olegovich Gusev, Krasnoyarsk (RU)

(73) Assignee: United Company RUSAL Engineering and Technology Centre LLC, Krasnoyarsk (RU)

( * ) Notice: Subject to any disclaimer, the term of this patent is extended or adjusted under 35 U.S.C. 154(b) by 252 days.

(21) Appl. No.: 15/551,873

(22) PCT Filed: Apr. 23, 2015

(86) PCT No.: PCT/RU2015/000264
§ 371 (c)(1),
(2) Date: Aug. 17, 2017

(87) PCT Pub. No.: WO2016/171580
PCT Pub. Date: Oct. 27, 2016

(65) Prior Publication Data
US 2018/0038004 A1    Feb. 8, 2018

(51) Int. Cl.
C25C 3/12 (2006.01)
C22C 19/07 (2006.01)
(Continued)

(52) U.S. Cl.
CPC ............ C25C 3/125 (2013.01); C04B 41/51 (2013.01); C04B 41/88 (2013.01); C22C 19/07 (2013.01);
(Continued)

(58) Field of Classification Search
CPC ............ C25C 3/06–3/24; C25C 3/08; C25C 7/02–7/025
See application file for complete search history.

(56) References Cited

U.S. PATENT DOCUMENTS 3,321,392 A * 5/1967 McMinn ................ C25C 3/085
204/247.3
5,310,476 A * 5/1994 Sekhar ................ C04B 41/5025
205/230
(Continued)

FOREIGN PATENT DOCUMENTS

CN      1986897 A    6/2007
CN    101724861 A    6/2010
(Continued)

OTHER PUBLICATIONS

Heidari et al. ("Pressureless Sintering of Tib2-Based Composites Using Ti and Fe Additives for Development of Wettable Cathodes", Light Metals, 2011, pp. 1111-1116). (Year: 2011).*
CN 101724861 B Espacenet Translation (Year: 2021).*
International Search Report for PCT/RU2015/00264 dated Feb. 18, 2016.

*Primary Examiner* — Alexander W Keeling
(74) *Attorney, Agent, or Firm* — Hogan Lovells US LLP (57) ABSTRACT

The invention relates to vertical or inclined electrodes of an electrolyzer for electrolytically producing aluminum from aluminum oxide. An electrode contains an electrode base and a surface coating based on refractory ceramics. According to a first variant of the invention, the electrode base is made of a composite material containing between 5% and 90% by mass of refractory ceramics, and of at least one
(Continued)

metal having a melting temperature exceeding 1000° C., which forms refractory intermetallic compounds upon interaction with aluminum, and/or containing at least one alloy of such a metal. According to a second variant of the invention, the electrode base is made of a metal alloy, for example structural steel or another alloy, and the surface of the electrode base has applied thereto an intermediary layer consisting of a composite material having the composition described above.

18 Claims, 2 Drawing Sheets

(51) Int. Cl.
    *C25B 11/043*     (2021.01)
    *C25B 11/055*     (2021.01)
    *C04B 41/51*     (2006.01)
    *C04B 41/88*     (2006.01)
    *C25C 3/18*     (2006.01)

(52) U.S. Cl.
    CPC .......... *C25B 11/043* (2021.01); *C25B 11/055* (2021.01); *C25C 3/12* (2013.01); *C25C 3/18* (2013.01)

(56) References Cited

U.S. PATENT DOCUMENTS

| | | | |
|---|---|---|---|
| 5,658,447 A * | 8/1997 | Watson | C25C 3/08 205/367 |
| 6,113,756 A * | 9/2000 | Juric | C25C 3/16 204/243.1 |
| 6,267,866 B1 | 7/2001 | Glesener et al. | |
| 7,462,271 B2 * | 12/2008 | Dionne | C04B 35/532 205/386 |
| 8,404,090 B2 * | 3/2013 | Camire | C25C 3/08 204/290.01 |
| 2013/0075669 A1 * | 3/2013 | Landwehr | C25C 3/08 252/504 |

FOREIGN PATENT DOCUMENTS

| | | | |
|---|---|---|---|
| CN | 101724861 B * | 7/2011 | |
| RU | 2031189 C1 | 3/1995 | |
| RU | 2012107070 A | 9/2013 | |
| RU | 2013108797 A | 10/2014 | |
| RU | 2013141551 A | 3/2015 | |
| WO | 2008132590 A2 | 11/2008 | |
| WO | WO-2008132590 A2 * | 11/2008 | ............... C25C 3/08 |

* cited by examiner

ALUMINUM ELECTROLYZER ELECTRODE (VARIANTS)

This application is a U.S. National Phase under 35 U.S.C. § 371 of International Application PCT/RU2015/000264, filed on Apr. 23, 2015. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

FIELD OF THE INVENTION

The present invention relates to devices used in electrolytically producing aluminum from aluminum oxide, in particular to vertical or inclined electrodes of an electrolyzer for electrolytically producing aluminum from the aluminum oxide dissolved in the molten electrolyte, namely to cathodes or cathode parts of a bipolar electrode.

The use of vertical or inclined wetted cathodes, as well as of bipolar electrodes in new aluminum electrolyzers reduces specific rated power consumption for aluminum production by means of reduction of an anode-to-cathode distance (ACD) between electrodes and improves electrolyzer performance on a per occupied area basis. The delay in development of new electrolyzers equipped with vertical or inclined electrodes is associated, among other things, with the lack of technological, cost-effective and technically feasible aluminum-wetted electrolyzer electrodes, which can be used as vertical or inclined wetted cathodes or as a cathode part of bipolar electrodes. For this purpose, such electrodes must exhibit high electrical conductivity, mechanical strength, crack resistance and they must be resistant to aluminum and molten electrolyte impact at 1000° C. Moreover, it is required that manufacturability, reliability and electrical resistivity of connection of these electrodes with a metal current collector shall be comparable with a weld contact between metallic materials. It is very difficult to bring together all these properties, that is why we presently witness the deficiency of functionally efficient aluminum-wetted electrodes and industrial implementations of new, more efficient electrolyzers for aluminum production.

PRIOR ART

Currently, the suitable material for aluminum-wetted cathodes is pure titanium diboride (TiB2) (Kvande H. Inert electrodes in aluminum electrolyzers// Light metals.—1999.—P. 369-376.). The reason of this is a unique combination of resistance to interaction with electrolyte and aluminum (Wendt H.; Dermeteik S. Erosion of sintered titanium diboride cathodes during cathodic aluminum deposition from lithium chloride/aluminum chloride melts.// J. Appl. Electrochem.—20.—1990.—P. 438-441.), good oxidation resistance (Tampieri A., Landi E., Bellosi A. On the oxidation behaviour of monolithic titanium diboride and alumina-TiB2 and silicon nitride-TiB2 composites.// J. Therm. Anal.—38 (12).—1992.—P. 2657-2668.) and wettability with aluminum. Typically, most of the additives added to $TiB_2$ to improve certain properties have a negative impact on the composition chemical stability under melted aluminum exposure (Odegard R. On the formation and dissolution of aluminum carbide in aluminum cells.// Aluminum. —64.—1988.—P. 84-86.).

It is known a wetted cathode from titanium diboride (U.S. Pat. No. 4,308,114, C25C 3/06, published on 29 Dec. 1981) having 96% of titanium diboride obtained by pressing at more than 2000° C. A wetted cathode from titanium diboride is known with metal additives (US Patent Application No. 2012/0222964, C25C 7/02, published on 6 Sep. 2012) added in the amount of 0.01 to 0.75% by mass for titanium diboride sintering at 1400-2100° C. Taking into account the high price of titanium diboride and technological complications arisen from the need for cathode sintering at the temperature about 2000° C., such methods for wetted cathodes production cannot be used in the context of industrial-scale production. The latter is the reason for titanium diboride-based composite materials usage.

Ceramic composite materials $B_4C$—$TiB_2$—TiC (RU Patent 2143411, C04B35/563, published on 27 Dec. 1999), $TiB_2$—SiC (International Patent Application WO 2013/089886, C25C 3/06, C25C 2/07, published on 20 Jun. 2013) for wetted cathode production are known.

The drawbacks of such materials include technological complications associated with the high sintering temperature, low resistance to impact and bending mechanical loads, high costs, and lower electrical conductivity compared to pure titanium diboride. Moreover, it is difficult to ensure such a contact between metal cathode current collectors and these materials, which would be as reliable and electrically resistant as welded contacts between metal materials.

Composite materials $TiB_2$—C are known, which can be used for production of aluminum-wetted cathodes or wetted coatings of carbon cathodes (RU Patent 2418888, C25C3/08, published on 20 May 2011). In particular, in accordance with U.S. Pat. No. 3,400,061, C25C 3/08, published on 3 Sep. 1968, a drained cathode is produced by mixing carbon-bearing filler, 10-20% binder and 10-80% titanium diboride or other aluminum-wetted refractory compound which reduces an anode-to-cathode distance and electrolyzer power consumption for aluminum production. The obtained cathode is moulded and then sintered at 900-1800° C. The drawback of these materials is in that in order to provide vertical cathodes with high durability and to allow the passage of high amperage direct current therethrough the cathodes must be thicker. That is why such cathodes have high dimensions, weight, and price. Moreover, it is difficult to ensure such a contact between metal cathode current collectors and these cathodes which would be as reliable and electrically resistant as welded contacts between metal materials.

Wetted composite materials are known, which comprise an aluminum-wetted component and an oxide component, such as aluminum oxide (International Patent Application WO 8902423, C25C 3/08, published on 23 Mar. 1989; U.S. Pat. No. 4,717,692, C25C 3/08, published on 5 Jan. 1988; RU Patent 2371523, C25C 3/08, published on 27 Oct. 2008; U.S. Pat. No. 5,753,163, C25C 3/08, published on 19 May 1998; RU Patent 2412283, C25C 3/08, published on 24 Feb. 2010).

The drawbacks of such materials include the low electrical conductivity and resistance to thermal shocks. Moreover, it is difficult to ensure such a contact between metal cathode current collectors and these materials which would be as reliable and electrically resistant as welded contacts between metal materials.

Composite materials of wetted cathodes obtained from an inert to aluminum ceramic matrix filled with aluminum are known (U.S. Pat. No. 4,560,448, C25C3/08, published on 24

Dec. 1985; U.S. Pat. No. 4,600,481, C25C3/08; published on 15 Jul. 1986; U.S. Pat. No. 4,650,552, C25C3/06, published on 17 Mar. 1987; RU Patent 2281987, C25C 3/08, published on 20 Aug. 2006).

The drawback of these wetted electrodes is that a composite material matrix is made of ceramics, that is why they show low thermal shock resistance and low resistance to impact and bending mechanical loads which can occur during industrial usage of cathodes. Moreover, it is difficult to ensure such a contact between metal cathode current collectors and these cathodes which would be as reliable and electrically resistant as welded contacts between metal materials.

CN Patent 103304239, C04B35/58, published on 18 Sep. 2013, discloses a method for production of a wetted $TiB_2$-based cermet composite material, the method comprising mixing composite particles $TiB_2$—$Al_2O_3$, oxide and metal additives, moulding and sintering mixtures in an inert atmosphere. In this invention, composite particles of $TiB_2$—$Al_2O_3$ are obtained by mixing particles of 60-90% $TiB_2$ with 10-40% $Al_2O_3$ sol, firing the obtained mixture at 900-1000° C. followed by sintered material crushing. The aluminum oxide, magnesium oxide, spinel $AB_2O_4$, aluminum titanate, titanium oxide or a combination some of them is used as an oxide additive, where A is one of Ni, Mg, Co, Zn, Cu, Li, and Fe or a combination thereof; B is at least one of Fe, Al, Co, Mn, Cr, and Ge. The oxide additive content is 5-25%. As a metal additive, 0.5-10% of Ni, Fe, Cu, Ti, Co, Cr, Mo, Mn or a combination thereof is used. The moulding process comprises pressing, vibration pressing or cold isostatic pressing at the pressure of 200-300 MPa, 250-400 MPa, and 80-150 MPa, respectively. Sintering is carried out at 1250-1600° C. during 120-480 min, and at the beginning, when the temperature is 800-1200° C., the sintering process is carried out in a vacuum at the residual pressure of $10^{-2}$-1 Pa, and then in the inert-gas atmosphere at the pressure of $0.8 \times 10^5$ Pa with the use of highly pure Ar, $N_2$ or a combination thereof with $O_2$ in the amount of 100 mg/m$^3$.

The drawback of this wetted composite material is that its structure consists mainly of a ceramic matrix rich in oxides. Due to this, the material has low electrical conductivity and is sensitive to impact and bending mechanical loads. Furthermore, it is difficult to create a reliable electrical contact between cathodes made of such material and metal conductors.

There are known methods for coating carbon bases with ceramic composite materials, because they show better electrical conductivity, durability and thermal shock resistance over the ceramic materials, and also favor in the creation of a contact with a metal current collector. For example, titanium diboride coatings applied to carbon cathodes of aluminum electrolyzers are known (International Patent Application WO 9320027, C25C3/08, published on 14 Oct. 1993; CN Patent 1807693, C25C3/08, published on 26 Jul. 2006; RU Patent 2518032, C25C3/06, published on 10 Jun. 2014; RU Patent 2135643, C25C3/06, published on 17 Aug. 1999). The drawbacks of such coatings include the use of a base from carbon-bearing materials which must be very thick to allow enough durability and the passage of high amperage direct current therethrough. That is why such cathodes have high dimensions and weight. Moreover, it is difficult to ensure such a contact between metal cathode current collectors and these cathodes which would be as reliable and electrically resistant as a welded contact between metal materials.

Also, methods for titanium diboride coating application to a metal base are known (U.S. Pat. No. 3,827,954, C25D3/66, published on 6 Aug. 1974; U.S. Pat. No. 3,697,390, C25D9/08, published on 10 Oct. 1972; International Patent Application WO 9320027, C25C3/08, published on 14 Oct. 1993). Thanks to the metal base, aluminum-wetted electrodes having such coatings will be highly electrically conductive and resistant to mechanical and impact loads and can be easily welded to metal conductors for reliable electrical contact. However, if these coatings have defects, such as cracks, delaminations, and pores, aluminum will penetrate to and interact with the base. This results in the base damage and contamination of the obtained aluminum. In addition, the coefficient of thermal expansion (CTE) of applied coating is much lower than that of a metal base, and so such coating, while is heated, will crack and delaminate from the base.

Methods for generating diffusion layers of borides (borating) and carbides (carburizing) on the surface of refractory metals are known. For example, RU Patent 2452798, C25D11/26, published on 10 Jun. 2012 suggests a method for producing a titanium diboride coating by the electrochemical polarization of titanium in the molten eutectic mixture of cesium and sodium chlorides comprising from 0.2 to 2.0% by mass of boric oxide at the temperature of 810-840 K under an argon atmosphere.

The closest analog (prototype) of the claimed technical solution is the solution according to International Patent Application WO 2008132590, C25C3/08, published on 6 Nov. 2008 disclosing an aluminum-wetted cathode comprised of a base made from a refractory metal molybdenum or tungsten, having on its surface a layer of this refractory metal carbide integrated into the base. The carbide surface is a cathode work surface where aluminum is reduced or is an intermediate layer of a coating from an aluminum-wetted ceramic material, whereon aluminum is reduced. According to the invention, the cathode base can comprise 50-100% by mass of refractory metal, 0.1-30% by mass of silicon, 0.1-10% by mass of aluminum, 0.1-20% by mass of carbon. A carbide layer on the base surface can be produced by diffusion saturation of the base surface with carbon (carburizing) and is no less than 0.01 mm thick. The carbide layer surface can be coated with a refractory ceramic substance, including at least one of titanium boride, chromium boride, vanadium boride, zirconium boride, hafnium boride, niobium boride, tantalum boride, molybdenum boride, cerium boride, nickel boride, and iron boride. The coating can also comprise additives for improved wetting with aluminum which can be selected from oxides or partially oxidated metals: iron, copper, cobalt, nickel, zinc, manganese, and combinations thereof. The coating can be produced by applying a suspension of refractory substance particles and additives for improved wetting in an inorganic polymer and/or colloid binder.

The drawback of such technical solution of the closest analog is that molybdenum or tungsten is used as a base, and these materials are expensive and difficult to weld to metal conductors for reliable electrical contact. Furthermore, these materials have a low oxidation resistance, and when used as a base of suspended from above vertical or inclined cathodes they can oxidate on open electrodes exposed from the molten electrolyte. Also, compared to well-known structural and heat-resistant steels, molybdenum and tungsten have a high frangibility and, accordingly are poorly resistant to mechanical and impact loads. Moreover, due to the high density of molybdenum and tungsten, cathodes are much heavier, which is not desirable in terms of the material requirements for cathodes and the load on the electrolyzer structural components.

DISCLOSURE OF THE INVENTION

The common for the closest analog (prototype) and claimed aluminum-wetted electrodes is that their base is covered with a protective aluminum-wetted layer of a surface coating based on refractory ceramics. As in the prototype, an aluminum-wetted electrode can be used as an electrolyzer inclined or vertical cathode for the electrolytic aluminum production from molten salts at the temperature below 960° C.

The object of the invention is to develop aluminum-wetted electrodes for an electrolyzer for electrochemical aluminum production, which would combine a high corrosion resistance intrinsic to ceramic materials and a high electrical conductivity, manufacturability and cost-effectiveness typical for metal materials.

The technical effect can be achieved by improving the electrode base resistance to oxidation, reducing electrode weight, improving durability and resistance of aluminum-wetted electrodes of an aluminum electrolyzer to impact and mechanical loads, and providing a reliable welded contact between an aluminum-wetted electrode and a metal conductor (current collector).

According to the first embodiment of the present invention, said technical effect is obtained by that an electrode base is made of a composite material comprising electrically conductive, aluminum-wetted and aluminum-and-electrolyte-resistant refractory ceramics, the content of which in the composite material is between 5% and 90% by mass, and the composite material comprises a metal or an alloy having a melting temperature exceeding 1000° C., which forms refractory intermetallic compounds upon interaction with aluminum. According to the second embodiment of the present invention, said technical effect is obtained by that an electrode base having a surface coating of refractory ceramics is made metal from steel or another metal or metal alloy, which can be, in particular, refractory and heat-resistant, and the base surface can be covered with an intermediate layer of composite material including electrically conductive, aluminum-wetted and aluminum-and-electrolyte-resistant refractory ceramics, the content of which in the composite material is between 5% and 90% by mass, and a metal having a melting temperature exceeding 1000° C. or an alloy having a melting temperature exceeding 1000° C., which form refractory intermetallic compounds upon interaction with aluminum.

The technical effect can be obtained by that a base or an intermediate layer made from the composite material including electrically conductive, aluminum-wetted and aluminum-and-electrolyte-resistant refractory ceramics and a metal or an alloy having a melting temperature exceeding 1000° C., which form refractory intermetallic compounds upon interaction with aluminum, is arranged immediately under a surface coating of refractory ceramics. When the integrity of the surface coating of refractory ceramics is lost, the molten aluminum reaches the composite material comprising a metal or an alloy having a melting temperature exceeding 1000° C., which forms refractory intermetallic compounds upon interaction with aluminum. The refractory intermetallic compounds resulted from the interaction between the metal contained in the composite material and aluminum form a protective layer greatly inhibiting further aluminum penetration into the electrode body and its destruction. This, together with a high aluminum-and-electrolyte resistance of refractory ceramics included into the composite material, defines the improved resistance of the claimed composite material to the molten aluminum. At the same time, through using the composite material having the claimed compound positioned under the electrode surface coating, the invention allows for improving resistance of the electrode to impact and mechanical loads, decreasing electrode mass, as well as providing a reliable welded contact between the electrode and the current collector due to the presence of a metal component in the composite material.

Further, the disclosure of the present invention covers its particular embodiments. To produce a base from a metal alloy, structural carbon steel or heat-resistant and oxidation-resistant steels and alloys having a melting temperature exceeding 1000° C. are used.

To produce a base from a composite material, as a metal having a melting temperature exceeding 1000° C., which forms refractory intermetallic compounds upon interaction with aluminum, at least one of the following metals is used: iron, nickel, manganese, titanium, tantalum, zirconium, chromium, niobium, cobalt, vanadium and/or at least one alloy thereof.

As refractory ceramics in the composite material, borides and/or carbides of titanium, zirconium, niobium, tantalum, tungsten, molybdenum, boron (only carbides) and mixtures thereof are used. Borides and carbides in the composite material may be produced as a part of the electrode manufacture process by adding boron and carbon in a metal or an alloy which is included in the composite material.

Refractory ceramics in the composite material are presented in the form of particles of 1-1000 μm, wherein the particles are uniformly distributed throughout the material.

The electrode base may be produced by methods of casting, or self-propagating high-temperature synthesis (SHS synthesis), or by a powder metallurgical technique.

According to the second embodiment of the invention, a base made of carbon steel or heat-resistant and fire-resistant metal alloy is coated with an intermediate layer of a composite material containing between 5 and 90% by mass of refractory ceramics, and metal or alloy, having a melting temperature exceeding 1000° C., which form refractory intermetallic compounds upon interaction with aluminum. The intermediate layer is positioned between the metal alloy base and a surface coating based on refractory ceramics, i.e. the surface coating is applied to the intermediate layer.

In both first and second embodiments of the invention, as a material for surface coating applied to the base the composite material containing more than 90% by mass of refractory ceramics, or refractory ceramics itself can be used.

According to the second embodiment of the invention, the composite material containing between 5% and 90% by mass of refractory ceramics, and metal or alloy having a melting temperature exceeding 1000° C., which form refractory intermetallic compounds upon interaction with aluminum, are used as a material for intermediate layer applied to the electrode base. According to a particular implementation of an electrode according to the second embodiment of the invention, the intermediate layer can be coated with an additional composite material layer with the higher content of refractory ceramics compared to the intermediate layer. There can be one or more additional layers, wherein thanks to such additional layer it becomes possible to consequently increase the content of refractory ceramics in the composite material of each additional layer from the base towards the surface coating, for example, from 5-90% by mass and up to more than 90% by mass (but not less than in the surface coating) and only providing that this composite material has to comprise metal or alloy having a melting temperature exceeding 1000° C., which form refractory intermetallic compounds upon interaction with aluminum. In another specific embodiment of the invention, an intermediate layer can be produced in the form of one layer with a gradual increase of the refractory ceramics content in the composite material from a base towards a surface coating. In this case, the refractory ceramics content in the composite material of the intermediate layer near the surface coating can be more than 90% by mass, and, in this case, the refractory ceramics is a surface coating, i.e. it gradually develops into the surface coating.

Typically, the cumulative thickness of the intermediate layer and the surface coating layer is between 0.5 mm and 10 mm.

According to a specific embodiment of the invention, a base surface saturated with carbon or an intermediate layer is arranged underneath the aluminum-wetted surface coating made of or based on the refractory ceramics.

An electrode can be a cathode or a cathode part of a bipolar electrode. To improve the resistance of said composite materials to molten aluminum, the melting temperature of metal or alloy included into the composition of these composite metals must be more than 1000° C., and such metal or alloy must form refractory intermetallic compounds upon interaction with aluminum. To meet this criterion and to reduce the costs of such materials used as composite material components which form refractory intermetallic compounds upon interaction with aluminum, the following metals are selected: iron, nickel, manganese, titanium, tantalum, zirconium, chromium, niobium, cobalt, vanadium, and/or alloys comprising at least one of the following metals: iron, nickel, manganese, titanium, tantalum, zirconium, chromium, niobium, cobalt, vanadium.

To ensure high electrical conductivity, aluminum-wettability, and low coefficient of thermal expansion (CTE) of composite materials and to enhance the chemical stability of said composite materials, they must comprise electrically conductive, aluminum-wettable and aluminum-and-electrolyte-resistant refractory ceramics. This could include borides and carbides of titanium, zirconium, niobium, tantalum, boron (carbides only), and mixtures thereof. Particles of refractory ceramics comprised in the composite material can be sized between 1 µm to 1000 µm or in a narrower size range included in said wide range between 1 µm to 1000 µm. Particles should be evenly distributed across the material volume, which can be ensured by known techniques.

Boride and carbide particles in the material can be produced by adding boron and carbon to a metal component. During heating for manufacturing the products of such materials, on these material reactions between metals and boron and carbon will occur to form corresponding borides and carbides. Well-known technologies allow the composite material with boride and carbide particles very uniformly distributed across the product volume to be obtained.

The content of ceramic particles in these materials can widely vary. At less than 90% by mass of the surface coating of refractory ceramics in the composite material, a metal base can contaminate aluminum to be produced, so composite materials having less than 90% by mass of refractory ceramics should be used only as a base and/or intermediate coating layers of aluminum-wetted elements. The use of this material as a base coating is not practical.

Having ceramic material content more than 90% by mass, composite materials can be used directly as a surface coating for aluminum-wetted electrodes since, in this case, they are similar to coatings based on refractory ceramics.

Having refractory ceramics content less than 5% by mass, composite materials have properties similar to these of metal alloys, so they cannot be covered with coatings based on refractory ceramics. It is not practical to use such materials as a base material without a composite material coating comprising ceramics more than 5%, or as an intermediate layer material, because they have low adhesion with the surface coating based on refractory ceramics, are subjected to the risk of coating thermal destruction due to the CTE difference between a substrate and coating, and have low aluminum and electrolyte resistance of such material.

The base for electrodes of composite materials having the claimed refractory ceramics content between 5% by mass and 90% by mass can be produced by any known methods (casting, SHS synthesis, powder metallurgical techniques, etc.).

Thanks to the high material electrical conductivity and durability, the base thickness can be reduced, and a relatively low CTE of these materials makes it possible to cover them by any known methods with more aluminum resistant and better aluminum-wetted coatings based on refractory ceramics, such as borides and carbides of titanium, zirconium, niobium, tantalum, tungsten, molybdenum, boron (carbides only). In addition, the similarity of CTE of ceramic coatings based on refractory ceramics and that of composite metal-ceramic materials prevents coating destruction caused by cathode heating to an electrolysis temperature.

To reduce the costs of aluminum-wetted electrodes, their base can be made of well-known structural, heat- and fire-resistant alloys having a melting temperature exceeding 1000 C, which form refractory intermetallic compounds upon interaction with aluminum. In this case, to protect an electrode base against aluminum and electrolyte impact it should be covered with a surface coating based on refractory ceramics, such as borides and carbides of titanium, zirconium, niobium, tantalum, boron (carbides only), tungsten, molybdenum, as well as mentioned above composite materials with refractory ceramics at more than 90% by mass or a surface coating made of a pure refractory ceramic material. When used as a material for a base for structural, heat- and fire-resistant metals and alloys, the coating can be ruined due to the difference between a substrate and coating, and so needs to be protected against such destruction by pre-coating the base with an intermediate layer of the mentioned above composite material containing between 5 and 90% by mass of refractory ceramics, since the higher the content of refractory ceramics, the more similar CTE of the composite material is to CTE of the surface coating made of or based on refractory ceramics. That is why the intermediate layer can be made of the composite material, the content of refractory ceramics in which, as was mentioned above, gradually increases from the base towards the coating. Alternatively, the intermediate layer can be covered with an additional layer containing more than 90% of ceramics, but not less than ceramics content in the surface coating. Accordingly, the increased ceramics content near the surface coating and its reduction near the metal base mitigates the risk of destruction on the interface "base-intermediate coating" and "intermediate (or additional) layer-surface coating".

The surface coating can be applied to the intermediate layer coated to the base produced of structural carbon steel or heat- and fire-resistant alloys by any known methods (thermal spraying, soldering, paste and paint coating with subsequent sintering, etc.). The cumulative thickness of the electrode intermediate and surface coating layers, as was mentioned above, can be in the range of 0.5 mm to 10 mm. To improve electrode resistance to aluminum and to enhance the surface coating adhesion to a base produced of a composite material or to a surface coating and an intermediate layer of the composite material, the base surface or the intermediate layer which is underneath the aluminum-wetted surface coating made of or based on the refractory ceramics can be saturated with carbon.

Methods for surface saturation of metal materials comprising iron, refractory metals and alloys with carbon (carburizing) are well-known and are industrially used to enhance hardness and wear-resistance of product surfaces. The carbon saturation of the surface of a metal or composite substrate or a composite intermediate layer (or an additional layer applied to the intermediate layer) will allow forming a layer on top of it enriched in the metal carbides of the base or intermediate layer, that is present in the composite material of at least one of the following metals: iron, nickel, manganese, titanium, tantalum, zirconium, chromium, niobium, cobalt, vanadium, and/or at least one present in the composite material alloys selected from said metals. Because carbides are refractory ceramics, it is evident that the carburizing will help to enhance the base and the intermediate and/or additional layer resistance to aluminum and the adhesion of the electrode surface coating based on the refractory ceramics thereto.

Thus, the inventive technical solution is characterized in that an aluminum-wetted base of an electrode is produced of a structural steel, or metal alloy, and/or composite material having lower density and enhanced durability and resistance to impact and mechanical loads compared to that of tungsten and molybdenum used in the prototype solution. Furthermore, the base produced of a structural steel or metal alloy covered with an intermediate composite material layer or made of a composite material has the higher oxidation resistance and it is readily connectible to a metal current collector by welding. The resistance to aluminum and electrolyte of wetted elements having said base is achieved by application of aluminum-wetted surface coatings made of or based on the refractory ceramics. For this reason, the claimed aluminum-wetted electrodes are advantageous in terms of material requirements, cost and technological effectiveness for use as an electrolyzer inclined or vertical cathode for electrolytic aluminum production from molten salts at the temperature below 960° C.

As far as well-known vertical or inclined bipolar electrodes include a cathode part which must meet the same requirements as wetted cathodes, electrodes according to both embodiments of the invention can be used not only as inclined or vertical cathodes, but as well as a cathode part of vertical or inclined bipolar electrodes in electrolyzers for electrolytic aluminum production from molten salts.

BRIEF DESCRIPTION OF THE DRAWINGS

The essence of the inventive technical solution will be further described with the reference to the schematic representations of parts of aluminum-wetted electrodes cross-sections of the embodiments of the invention (FIG. 1 and FIG. 2). The drawings are illustrations of a part of the electrode cross-section adjacent to the surface since the shape and dimensions of electrodes can be randomly selected.

FIG. 1 (A) is a representation of an electrode comprising a base 2 of a composite material containing between 5 and 90% of ceramics and a coating 3 based on refractory ceramics.

FIG. 1 (B) is a representation of an electrode comprising a base 2 of a composite material containing between 5 and 90% by mass of refractory ceramics, the surface 4 of which is carbon saturated and has a coating 3 based on refractory ceramics applied thereto.

FIG. 2 (A) is a representation of an electrode comprising a base of a structural steel or a metal alloy 1 having a layer of a composite material 2 containing between 5 and 90% by mass of refractory ceramics and a coating based on the refractory ceramics 3 applied thereto.

FIG. 2 (B) is a representation of an electrode comprising a base 1 of a structural steel or a metal alloy, a surface 4 of which is carbon saturated and has a coating 3 based on the refractory ceramics applied thereto. In this case, the carbon saturated steel or alloy surface plays the role of an intermediate layer between the base and the coating.

FIG. 2 (C) is a representation of an electrode comprising a base 1 of a structural steel or a metal alloy with applied an intermediate layer 2 of a composite material containing between 5 and 90% by mass of refractory ceramics, the surface 4 of which is carbon saturated and has a coating 3 based on the refractory ceramics applied thereto.

EMBODIMENTS OF THE INVENTION

Figure 1:
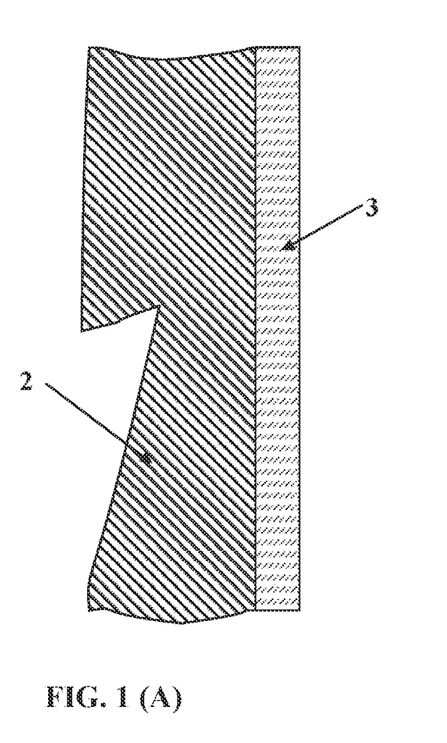
FIG. 1 is a representation of the first embodiment of electrodes comprising a base 2 of a composite material containing between 5 and 90% by mass of refractory ceramics.

Example 1 illustrates the first embodiment of the invention. To produce an aluminum-wetted electrode, a plate of the composite material 80% by mass Fe—20% by mass $TiB_2$, having dimensions of 94*77*10 mm were used as a workpiece for a base 2. A stainless steel rod served as a current collector was arc-welded to the plate. Next, the workpiece surface of the wetted electrode was covered with a suspension of ceramic particles $TiB_2$ in a solution of phenol-formaldehyde resin to create a surface coating. The covered coating was dried for 1 hour at room temperature, then for 1 hour at 150° C. In such a way, a surface coating layer 3 having a thickness of 1.5 mm and consisted of titanium diboride (93% by mass) and phenol formaldehyde resin (7% by mass) was formed on the aluminum-wetted electrode surface.

FIG. 1(A) schematically illustrates a cross-section of the electrode produced according to the Example 1.

Produced by this method sample was tested as a vertical cathode at electrolysis with two vertical electrodes in a corundum container having a diameter 110 mm and a height 220 mm and placed inside a safety graphite crucible. A copper plate having dimensions of 115*80*5 mm was used as an anode. The cathode was immersed in the melt so that a welded contact with a current collector was above the electrolyte level. The anode was fully immersed into the melt. The current densities of the anode and cathode were 0.5 A/cm², the electrolysis temperature was 850° C.

In a few minutes after the start, the voltage was set in the range of 4.63÷4.65V, and then its changes were insignificant. The test duration was 24 hours. Based on the test results, it was found that the surface of the electrode-cathode produced according to the invention was well aluminum-wetted and didn't have any signs of destructions. The cathode preserved its geometry. The cathode aluminum mass was 350.2 g. The current output as per the pure aluminum basis was 70%. Metal contamination with iron—the main component of the cathode metal base—was less than 0.1% by mass.

Figure 2:
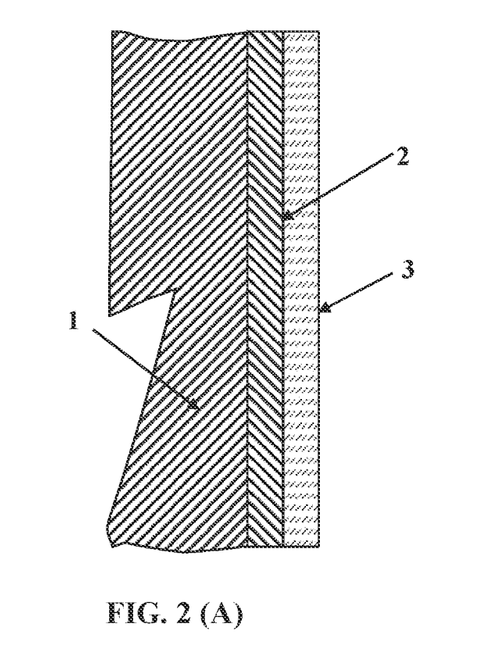
FIG. 2 is a representation of the second embodiment of electrodes comprising a base of a metal alloy 1 and an intermediate layer of a composite material 2.

Example 2 illustrates the second embodiment of the invention. To produce an aluminum-wetted electrode, a metal base of the structural steel St3 having dimensions of 100*70*5 mm was used. The metal (steel) base had a shank for welding a metal current collector thereto. At the first step, foam ferronickel plates having a thickness of 3 mm were brazed to a base 1 to form an intermediate layer. The specific porosity of the foam ferronickel was 60 PPI. The porous metal base on the base surface was impregnated with a suspension of ceramic particles $TiB_2$ in a solution of phenol-formaldehyde resin to produce a composite material intermediate layer. At the next step, a layer of that suspension of about 1 mm in thickness was applied to form the surface coating. Further, an electrode workpiece having the surface coating applied thereto was dried for 1 hour at room temperature, than for 1 hour at 150° C. For coat sintering, samples were fired for 3 hours at 800° C. in the activated carbon filling. Thus, the layer of composite material consisted of a ferronickel matrix and titanium diboride particles distributed therein, and the surface coating layer 3 based on the refractory ceramics were formed on the surface of the metal (steel) base. The refractory ceramics content in the composite material of the intermediate layer was about 80% by mass.

FIG. 2(A) schematically illustrates a cross-section of the electrode produced according to the Example 1.

Produced by this method sample was tested as a vertical cathode at electrolysis with two vertical electrodes in a corundum container having a diameter 110 mm and a height 220 mm and placed inside a safety graphite crucible. A copper plate having dimensions of 100*70*3 mm was used as an anode. The anode and cathode were immersed into the melt so that the electrolyte level above them was about 1 cm. The current densities of the anode and cathode were 0.5 $A/cm^2$, the electrolysis temperature was 850° C.

In a few minutes after the start, the voltage was set in the range of 5.36÷5.41V, then changed insignificantly. The test duration was 24 hours. Based on the test results it was found that the surface of the cathode was well aluminum-wetted and didn't have any signs of destructions. The cathode preserved its geometry. The cathode aluminum mass was 365.3 g. The current output as per the pure aluminum basis was 75%. Metal contamination with iron—the main component of the cathode metal base—was less than 0.1% by mass.

The other electrodes produced with the use of the metal base of the structural steel St3 according to the embodiments of the invention of FIGS. 2B and 2C have shown similar results.

Example 3 is an illustration of a specific variant of the invention according to the first embodiment with the carburization of a composite material base surface. To produce an aluminum-wetted electrode, a plate of the composite material containing 80% by mass Fe—20% by mass $TiB_2$, having dimensions of 96*81*10 mm was used as a workpiece for a base 2. The plate was solid-phase carburized in order to diffusely saturate a surface layer 4 of the sample with carbon. As a carburizing agent, the mixture consisting of 80% of charcoal and 20% of sodium carbonate was used. The carburizing process continued for 10 hours in the sealed corundum container at 900° C. Then, a stainless steel rod served as a current collector was arc-welded to the composite material plate. Next, the workpiece surface of the wetted element was covered with a suspension of ceramic particles $TiB_2$ in a solution of phenol-formaldehyde resin. The electrode base 2 was dried for 1 hour at room temperature, then for 1 hour at 150° C. In such a way, a surface coating layer 3 having a thickness of 2 mm and consisted of titanium diboride (93% by mass) and phenol formaldehyde resin (7% by mass) was formed.

FIG. 1(B) schematically illustrates a cross-section of the electrode produced according to the Example 3.

Produced by this method sample was tested as a vertical cathode at electrolysis with two vertical electrodes in a corundum container having a diameter 110 mm and a height 220 mm and placed inside a safety graphite crucible. A copper plate having dimensions of 114*79*4.4 mm was used as an anode. The cathode was immersed in the melt so that a welded contact with a current collector was above the electrolyte level. The anode was fully immersed into the melt. The current densities of the anode and cathode were 0.5 $A/cm^2$, the electrolysis temperature was 850° C.

In a few minutes after the start, the voltage was set in the range of 5.95÷6.05V, then changed insignificantly. The test duration was 24 hours. Based on the test results it was found that the surface of the cathode was well aluminum-wetted and didn't have any signs of destructions. The cathode preserved its geometry. The cathode aluminum mass was 360 g. The current output as per the pure aluminum basis was 65%. Metal contamination with iron—the main component of the cathode metal base—was less than 0.1% by mass.

Obtained results have confirmed that the inventive aluminum-wetted electrode is resistant to oxidation, aluminum, and electrolyte, has the high electrical conductivity, ensures a reliable electrical contact between an aluminum-wetted element and a current collector.

The invention claimed is:

1. An electrolyzer electrode for electrolytically producing aluminum from aluminum oxide dissolved in molten electrolyte, the electrolyzer electrode consisting of:
   an electrode base and a surface coating applied to the electrode base;
   wherein the surface coating is based on or made from refractory ceramics; and
   wherein the electrode base consists of a composite material containing 5% to less than 90% by mass of refractory ceramics and at least one metal having a melting temperature exceeding 1000° C., which form refractory intermetallic compounds upon interaction with aluminum, or at least one alloy made from metals each having a melting temperature exceeding 1000° C.,
   wherein the refractory ceramics included in the composite material of the electrode base and the refractory ceramics in the surface coating are selected from the group consisting of borides and carbides of titanium, zirconium, niobium, tantalum, tungsten, molybdenum, boron carbides, and mixtures thereof, and
   wherein the refractory ceramics in the composite material are uniformly distributed throughout the composite material volume in the form of particles of 1-1000 μm.

2. The electrode according to claim 1, wherein the at least one metal having a melting temperature exceeding 1000° C. is selected from the group consisting of: iron, nickel, manganese, titanium, tantalum, zirconium, chromium, niobium, cobalt, vanadium, and alloys thereof.

3. The electrode according to claim 1, wherein the borides and carbides of titanium, zirconium, niobium, tantalum, tungsten, molybdenum, and boron carbides are formed into the composite material of the electrode base during an electrode production process by adding boron and carbon into a metal or an alloy.

4. The electrode according to claim 1, wherein the surface coating applied to the electrode base comprises refractory ceramics in an amount of more than 90% by mass.

5. The electrode according to claim 1, wherein it is a cathode or a cathode part of a bipolar electrode.

6. The electrode according to claim 1, wherein the electrode base consists of a composite material containing 5% to less than or equal to 20% by mass of refractory ceramics and at least one metal having a melting temperature exceeding 1000° C., which form refractory intermetallic compounds upon interaction with aluminum or at least one alloy made from metals each having a melting temperature exceeding 1000° C.

7. A system comprising the electrolyzer electrode of claim 1 and a metal current collector, wherein the electrode base is welded to the current collector.

8. An electrolyzer electrode for electrolytically producing aluminum from aluminum oxide dissolved in molten electrolyte, the electrolyzer electrode consisting of:
an electrode base and a surface coating applied to the electrode base;
wherein the surface coating is based on or made from refractory ceramics; and
wherein the electrode base consists of a composite material containing 5% to less than 90% by mass of refractory ceramics, carbon saturated into one or more surfaces of the electrode base by carburization, and at least one metal having a melting temperature exceeding 1000° C., which form refractory intermetallic compounds upon interaction with aluminum, or at least one alloy made from metals each having a melting temperature exceeding 1000° C.;
wherein the refractory ceramics included in the composite material of the electrode base and the refractory ceramics in the surface coating are selected from the group consisting of borides and carbides of titanium, zirconium, niobium, tantalum, tungsten, molybdenum, boron carbides, and mixtures thereof; and
wherein the refractory ceramics in the composite material are uniformly distributed throughout the composite material volume in the form of particles of 1-1000 μm.

9. An electrolyzer electrode for electrolytically producing aluminum from an aluminum oxide dissolved in molten electrolyte, the electrolyzer electrode consisting of:
an electrode base, an intermediate layer applied to the electrode base, and a surface coating applied to the intermediate layer;
wherein the electrode base consists of steel or a metal alloy;
wherein the intermediate layer consists of a composite material containing 5% to less than 90% by mass of refractory ceramics and at least one metal having a melting temperature exceeding 1000° C., which forms refractory intermetallic compounds upon interaction with aluminum, or at least one alloy made from metals each having a melting point temperature exceeding 1000° C.;
wherein the at least one metal having a melting temperature exceeding 1000° C. is selected from the group consisting of: iron, nickel, manganese, titanium, tantalum, zirconium, chromium, niobium, cobalt, vanadium, and alloys thereof;
wherein the surface coating is based on or made from refractory ceramics; and wherein the refractory ceramics in the composite material of the intermediate layer and the refractory ceramics in the surface coating are selected from the group consisting of borides and carbides of titanium, zirconium, niobium, tantalum, tungsten, molybdenum, and boron carbides and mixtures thereof.

10. The electrode according to claim 9, wherein the metal alloy for the electrode base is structural carbon steel.

11. The electrode according to claim 10, wherein heat-resistant and fire-resistant steel or heat-resistant and fire-resistant metal alloy is used as a base material.

12. The electrode according to claim 9, wherein the borides and carbides of titanium, zirconium, niobium, tantalum, tungsten, molybdenum, and boron carbides in the composite material of the electrode base are formed during an electrode production process by adding boron and carbon into metal or alloy.

13. The electrode according to claim 9, wherein the refractory ceramics are presented in the form of particles of 1-1000 μm, wherein the particles are uniformly distributed throughout the composite material.

14. The electrode according to claim 9, wherein for the intermediate layer, the content of refractory ceramics increases across the layer thickness from the electrode base towards the surface coating.

15. The electrode according to claim 9, wherein the cumulative thickness of the intermediate layer and surface coating is 0.5-10 mm.

16. The electrode according to claim 9, wherein it is a cathode or a cathode part of a bipolar electrode.

17. The electrode according to claim 9, wherein the intermediate layer consists of a composite material containing 5% to less than or equal to 20% by mass of refractory ceramics and at least one metal having a melting temperature exceeding 1000° C., which form refractory intermetallic compounds upon interaction with aluminum or at least one alloy made from metals each having a melting temperature exceeding 1000° C.

18. An electrolyzer electrode for electrolytically producing aluminum from an aluminum oxide dissolved in molten electrolyte, the electrolyzer electrode consisting of:
an electrode base, an intermediate layer applied to the electrode base, and a surface coating applied to the intermediate layer;
wherein the electrode base consists of steel or a metal alloy;
wherein the intermediate layer consists of a composite material containing 5% to less than 90% by mass of refractory ceramics, carbon saturated into one or more surfaces of the intermediate layer by carburization that are arranged underneath the surface coating, one or more resins, and at least one metal having a melting temperature exceeding 1000° C., which form refractory intermetallic compounds upon interaction with aluminum, or at least one alloy made from metals each having a melting temperature exceeding 1000° C.;
wherein the at least one metal having a melting temperature exceeding 1000° C. is selected from the group consisting of: iron, nickel, manganese, titanium, tantalum, zirconium, chromium, niobium, cobalt, vanadium, and alloys thereof;
wherein the surface coating is based on or made from refractory ceramics; and
wherein the refractory ceramics in the composite material of the intermediate layer and the refractory ceramics in the surface coating are selected from the group consisting of borides and carbides of titanium, zirconium, niobium, tantalum, tungsten, molybdenum, and boron carbides and mixtures thereof.

\* \* \* \* \*